US008467814B2

(12) United States Patent
Gan et al.

(10) Patent No.: US 8,467,814 B2
(45) Date of Patent: Jun. 18, 2013

(54) SMS SHORTCODE ALLOCATION

(75) Inventors: Jiuhe Gan, Cupertino, CA (US); Tong Zhu, Fremont, CA (US); Kenneth Tsz Ho, Belmont, CA (US); Zhaowei Charlie Jiang, Palo Alto, CA (US); Venkata Narasimha Rao Yerubandi, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1171 days.

(21) Appl. No.: 11/853,618

(22) Filed: Sep. 11, 2007

(65) Prior Publication Data

US 2009/0069037 A1 Mar. 12, 2009

(51) Int. Cl.
*H04W 4/00* (2009.01)

(52) U.S. Cl.
USPC .................... 455/466; 455/414.1; 455/412.1; 455/406; 455/422.1; 455/435.2

(58) Field of Classification Search
None
See application file for complete search history.

(56) References Cited

U.S. PATENT DOCUMENTS

| | | | | |
|---|---|---|---|---|
| 5,758,088 | A | 5/1998 | Bezaire et al. | |
| 6,021,433 | A | 2/2000 | Payne et al. | |
| 6,167,426 | A | 12/2000 | Payne et al. | |
| 6,567,419 | B1 | 5/2003 | Yarlagadda | |
| 6,735,614 | B1 | 5/2004 | Payne et al. | |
| 7,313,133 | B2 | 12/2007 | Yarlagadda | |
| 7,356,337 | B2 * | 4/2008 | Florence | 455/432.2 |
| 7,693,902 | B2 | 4/2010 | Kim et al. | |
| 2002/0084888 | A1 | 7/2002 | Jin | |
| 2004/0032860 | A1 | 2/2004 | Mundra et al. | |
| 2004/0090930 | A1 | 5/2004 | Lee et al. | |
| 2004/0160979 | A1 | 8/2004 | Pepin et al. | |
| 2005/0020270 | A1 | 1/2005 | Buckley | |
| 2005/0144020 | A1 * | 6/2005 | Muzaffar et al. | 705/1 |
| 2005/0286489 | A1 | 12/2005 | Shin et al. | |
| 2006/0199598 | A1 | 9/2006 | Lee et al. | |
| 2006/0277271 | A1 | 12/2006 | Morse et al. | |
| 2006/0277308 | A1 | 12/2006 | Morse et al. | |
| 2007/0136279 | A1 | 6/2007 | Zhou et al. | |
| 2007/0183596 | A1 * | 8/2007 | Winkler | 380/247 |
| 2007/0275738 | A1 * | 11/2007 | Hewes et al. | 455/466 |
| 2009/0018817 | A1 * | 1/2009 | Sang et al. | 704/9 |
| 2009/0106770 | A1 * | 4/2009 | Gan et al. | 719/313 |

FOREIGN PATENT DOCUMENTS

| | | | |
|---|---|---|---|
| EP | 1 161 038 | A2 | 12/2001 |
| WO | 01/78430 | A1 | 10/2001 |

OTHER PUBLICATIONS

"Way2SMS—Free SMS any where in India," Way2SMS.com, accessed Oct. 29, 2007, 2 pages http://www.way2sms.com/content/index.html.

(Continued)

*Primary Examiner* — Willie J Daniel, Jr.
(74) *Attorney, Agent, or Firm* — James J. DeCarlo; Greenberg Traurig, LLP

(57) ABSTRACT

A system, apparatus, and method are directed towards managing short code allocation policies across a plurality of different carriers for multiple applications. Each carrier provides to a centralized routing service a short code policy that includes an extension allocation policy. The extension allocation policy may specify whether the extensions are allocated based on a dynamical recycle allocation, a range recycle allocation, a pass-through allocation, or a re-usekey based allocation policy, or other mechanism. When a message is sent from an application, a carrier is determined to send the message to a destination mobile device. The carrier's short code policy, including the extension allocation policy, is then used to select how to allocate and/or re-allocate a short code and extension for use with the message. The message may then be modified to include the selected short code and extension, and is then sent using the determined network carrier.

20 Claims, 7 Drawing Sheets

OTHER PUBLICATIONS

"What is 160by2?," www.160by2.com, accessed Oct. 29, 2007, 2 pages http://www.160by2.com/.
Arjun, M., "SMS Advertising in India," www.techpersona.com, May 22, 2007, accessed Aug. 13, 2007, 14 pages http://www.techpersona.com/wp/2007/05/22/sms-advertising-in-india/.
"Way2SMS Starts off New Era in Mobile Advertising Through Mobitisements," Mobile Marketing, Jun. 11, 2007, accessed Aug. 13, 2007, 3 pages http://mobilemarketinginthenews.blogspot.com/2007/06/way2sms-starts-off-new-era-in-m . . . .

* cited by examiner

```
<Carrier Short Code Policy>

<Carrier Id = "Carrier XYZ">

<Service Short Code List>
<Service Short Code sc="92466">
<Service Short Code sc="445566">

<AppId> social networking2</AppId>
</Service Short Code>
</Service Short Code List>

<Service Short Code List>
<Short Code Range basewidth="6" exwidth="3" low="445566000"
high="445566990"
Id="1" />

<Short Code Range basewidth="7" exwidth="3" low="1110440900"
high="1110440990"
Id="2" />

<Short Code Range basewidth="7" exwidth="3" low="1111440000"
high="1111440990"
Id="3" />
</Service Short Code List>

<ExtAlloc>
<Extrange low="1" high="2073" allocpolicy="0" />

<ReservedExts>
<reservedExtRange>
<ExtRange low="921" high="925" allocpolicy="3"/>
<AppId> social networking</AppId>

<ExtRange low="891" high="910" allocpolicy="1"/>
<AppId> smsmail</AppId>

<ExtRange low="941" high="9450" allocpolicy="2"/>
<AppId> messenger</AppId>

.....
```

SMS SHORTCODE ALLOCATION

FIELD OF THE INVENTION

The invention relates generally to mobile communications, and more particularly but not exclusively to managing dynamic allocations of short code and extensions across disparate network carriers and applications.

BACKGROUND OF THE INVENTION

The use of mobile technologies is steadily on the increase, for both business and personal uses. Mobile phones are a common site today and many people own personal information management (PIM) devices, palmtop computers, and so forth, to manage their schedules, contacts, and to stay connected with friends, family, and work. Employees on the move often appreciate the value of staying connected with their business through their mobile devices.

With such a variety of mobile devices, one can receive email messages, Instant Messaging (IM) messages, and Short Message Service (SMS) text messages, in addition to regular voice calls. Recently, the use of SMS and other forms of text messaging has become very popular. But of this popularity may, at least in part, be attributed to the use of short codes by various mobile marketing activities.

Briefly, short codes are typically short strings of numbers or characters to which a text message may be addressed and includes a common addressing scheme for participating wireless networks. Short codes are designed to provide a way to deploy interactive mobile data applications, including voting, polling, "text and win" contests, surveys, focus groups, direct marketing, live chats, games, and the like. Currently, there are at least two types of short codes, including random short codes and vanity short codes. Random short codes include those numbers that may be randomly assigned, usually within at least some constraints, while vanity short codes are those selected based on a business requirement, such as for brand recognition, or the like.

Short codes may be employed by different network carriers to indicate different applications, different services, or the like. Moreover, different network carriers may use a different number of short codes, be assigned non-contiguous blocks of short codes with extensions within a range of short codes with extensions, or the like. Moreover many short codes may be assigned, and/or re-assigned for a given network carrier. Managing of short codes based on differing policies, network carriers, and the like, may sometimes become very complicated. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein:

FIG. 7 illustrates one embodiment, of an example of a short code policy.

DETAILED DESCRIPTION OF THE INVENTION

Figure 1:
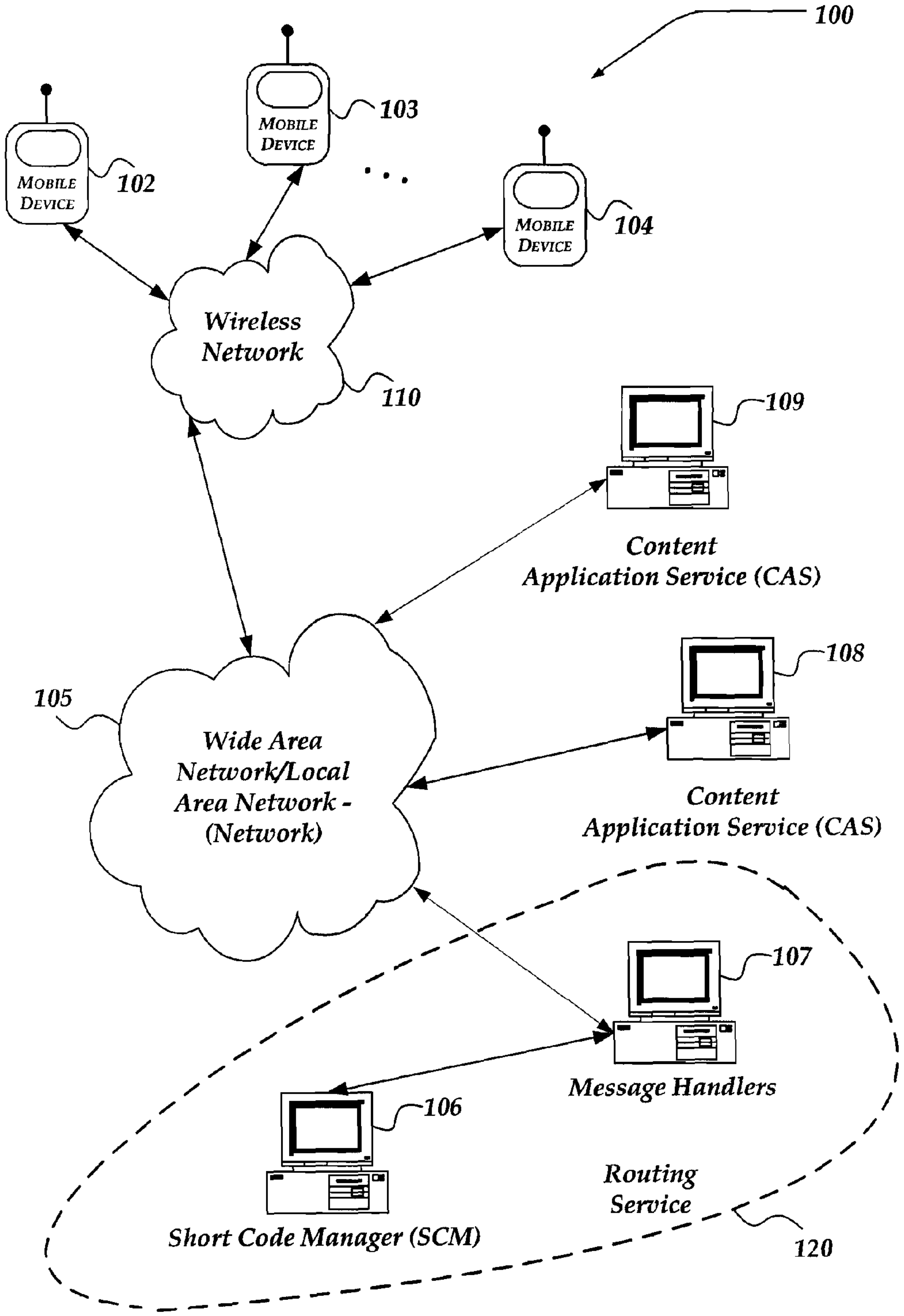
FIG. 1 shows a functional block diagram illustrating one embodiment of an environment for practicing the invention.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The term Short Message Service (SMS) refers to a communication mechanism for providing connectionless transfers of limited size messages between networked devices. SMS messages may be cell broadcast services which are periodically delivered short message to a pre-defined set of computing devices in a given area, or point-to-point services which include short messages sent to a specific user. The SMS protocol is described in more detail in International Standard ISO/IEC 21989, which is available at through the International Standards Organization (ISO). As used herein, SMS refers to all such Short Message communications, and those derived therefrom.

As used herein, the terms "text messaging," or "text message" refer to SMS messaging, as well as a variety of other limited size message protocols, including, but not limited to Instant Messaging (IM), Multimedia Messaging Service (MMS) message, or an Enhanced Message Service (EMS) messaging protocols.

Moreover, the terms "mobile originated," and "MO" refer to any communications that originates or is initiated from a mobile device, while the terms "mobile terminated," and "MT" refer to any communications that terminates at the mobile device. Thus, if an application, such as an email application, web service application, or the like, sends a message to a mobile device, such message is known as a MT type message. Similarly, a message sent by a mobile device to the application is known as a MO type message. Messages that are sent between two mobile devices are known as "mobile to mobile," or "MTM" communications.

The term "short code" refers generally to short strings of numbers or letters to which a message may be addressed and includes a common addressing scheme for participating wireless networks. Examples of short codes might include, "92466," "445566," or the like. However, it is clear that short codes may also include alpha characters, or other symbols. Short codes may also include short code extensions, or simply "extensions. Such "extensions" may include virtually any alpha character, a numeric character, symbol, and/or any combination of alpha, numeric, and/or symbols. For example, typical short code extensions may employ a numeric range of numbers, such as from '000' to '100.' Short code extensions may also include non-contiguous sequences of numbers, or the like. Thus, in one embodiment, a network carrier may have allocated, for example, one sequence of short code extensions from 921-925, and another sequence, for example, from 891-910, or the like. It should be recognized that different network carriers may have different sequences of assigned short codes, extensions, ranges and/or sequences of short codes, or the like. Thus, the invention is not constrained to these short code examples, and other short codes, extensions, or the like, may also be employed. It is further recognized that in many articles, publications, or the like, the term short code may sometimes refer to both the short code itself and an extension. Therefore, as used herein, the term short code includes an extension, unless otherwise so indicated, without departing from the scope of the invention.

The term "service short code" refers to a short code that is assigned to an application, service, or the like. Service short codes may be assigned to different applications, services, or the like, for different network carriers. Moreover, multiple applications may share the same service short codes.

Briefly stated, the present invention is directed towards a system, apparatus, and method for managing short code allocation policies across a plurality of different carriers for multiple applications. Each carrier within the plurality of different carriers provides a short code policy to a centralized routing service. The short code policies may specify a carrier identifier, list of service short codes available for the carrier, a list of short codes available, and an extension allocation policy. The extension allocation policy may specify whether the extensions are allocated based on a dynamical recycle allocation, a range recycle allocation, a pass-through allocation, or a re-usekey based allocation policy. However, other extension allocation policies may also be specified, without limiting the scope of the invention. In one embodiment, the extension allocation policy may be based on an application. Multiple ranges of short codes with extensions may be specified for a given carrier. Thus, in one embodiment, a mapping may also be performed of short codes with extensions from an application to those for a given network carrier.

When a message is sent from an application, such as an MT message, a network carrier's short code policy, including the extension allocation policy may be used to select how to allocate and/or re-allocate a short code and extension for use with the message. In one embodiment, the network carrier is determined based on the type of message, and/or destination mobile device. The message may then be modified to include the selected short code and extension. In addition, session data associated with the selected short code and extension may be stored. Such session data may include, for example, information about the application, the MT message, the network carrier, a user of the mobile device, or the like. The modified MT message may then be routed using the determined network carrier.

In one embodiment, the application may provide a short code, and the invention may select the extension. In one embodiment, application might provide a short code and extension, which may then be mapped to another short code and/or extension based on the determined network carrier. In another embodiment, the short code may be selected based on the network carrier's short code policy, and the extension may be dynamically selected based on the extension allocation policy. Using the various embodiments enables managing of the dynamic allocation and/or re-allocation of short code extensions for short codes in an environment that includes multiple network carriers having differing allocation policies and/or at least one set of non-contiguous sequences of short code extensions.

When a message is received from a mobile device, such as an MO message, any stored session data may be used to determine how to route the message to an application. If the received message includes a short code (and extension), service code, or the like, such information may also be used, or used instead of, or in addition to, the stored session data, to determine the application for which the message is to be routed.

In one embodiment, the short codes and extensions are employed within the context of Short Messaging Service (SMS) messages. However, the invention is not so limited, and the short codes, extensions, and/or service codes may also be employed within any of a variety of other text messaging protocols, emails, within HTML data, or the like, without departing from the scope of the invention.

Illustrative Operating Environment

FIG. 1 shows components of an exemplary environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, mobile devices 102-104, content application services (CAS) 108-109, and routing service 120. Routing service 120 further includes short code manager (SCM) 106 and message handlers 107.

Generally, mobile devices 102-104 may include virtually any portable computing device capable of receiving and sending a message over a network, such as network 105, wireless network 110, and the like, to and from another computing device, another mobile device, and the like. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, to other computing devices.

Mobile devices 102-104 may be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device. However, the present invention is not limited to these message protocols, and virtually any other message protocol may be employed.

Mobile devices 102-104 may be further configured to enable a user to participate in communications sessions, such as IM sessions, and the like, and to transfer an existing communications session, and the like, between devices. As such, mobile devices 102-104 may include a client application that is configured to manage various actions on behalf of the client device. For example, the client application may enable a user to interact with the browser application, email application, IM applications, SMS application, and the like, to manage signing into a communications session, such as an IM session, between the devices. In one embodiment, the client application might be the SMS application.

Mobile devices 102-104 may further be configured to include a client application that enables the end-user to log into an end-user account that may be managed by another computing device. Such end-user account, for example, may be configured to enable the end-user to receive emails, send/receive IM messages, SMS messages, access selected web pages, and the like. Moreover, the end-user account may be further configured to enable the end-user authorization to start an IM session, or other communications session, on a mobile device.

Mobile devices 102-104 may each receive messages sent from CAS 108-109, or even from one of the other mobile devices 102-104, or another computing device. Mobile devices 102-104 may also send messages to one of CAS 108-109, or the like. In one embodiment, messages from CAS 108-109 may include a short code and extension that a user of the receiving mobile device may then use to communicate with one of CAS 108-109. For example, the short code and extension may be part of a header in a message received by mobile devices 102-104, such as in a source address or "from" header, or the like. The short code and extension may then be used by the user for responding to the received message. However, in another embodiment, the short code and extension may be within a body of the message, associated with a link within the body of the message, or the like. In such events, the user may extract the short code and extension for use in sending messages to one of CAS 108-109.

Wireless network 110 is configured to couple mobile device 104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Although not illustrated in FIG. 1, wireless network 110 may include a plurality of network carrier gateways that are configured to manage network communications between at least one of mobile devices 102-104, and another mobile device, and/or a computing device managed through network 105. One embodiment of network carrier gateways is described in more detail below in conjunction with FIG. 2.

Network 105 is configured to enable communications between routing service 120 and CAS 108-109 and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

CAS 108-109 includes virtually any device that may be configured to provide an application service. Such application services or simply applications include, but are not limited to, email applications, search applications, video applications, audio applications, graphic applications, social networking applications, text message applications, or the like. In one embodiment, CAS 108-109 may operate as a web server. However, CAS 108-109 are not limited to web servers, and may also operate as a messaging server, a File Transfer Protocol (FTP) server, a database server, a content server, or the like, in which to provide an application. Additionally, each of CAS 108-109 may be configured to perform a different operation. Thus, for example, CAS 108 may be configured as a messaging server, while CAS 109 is configured as a database server, social networking server, or the like. Devices that may operate as CAS 108-109 include personal computers desktop computers, multiprocessor systems, microprocessor-based or programmable consumer electronics, network PCs, servers, and the like.

CAS 108-109 may be configured to initiate a message to be sent to one of mobile devices 102-104, in one embodiment. Such messages may include, for example, an alert, an advertisement, a relayed message, a news message, or the like. In one embodiment, CAS 108-109 may also respond to a request to perform some action, from one of mobile devices 102-104, or even another computing device. In one embodiment, CAS 108-109 may employ short codes and extensions within messages sent to one of mobile devices 102-104. Such short codes and extensions may be configured independent of a network carrier, and/or destination mobile device. For example, in one embodiment CAS 108-109 may employ extensions from an internally generated list of extensions. In one embodiment, SCM 106 may then map the received short code and/or extension to another short code and/or extension that may be based on a network carrier through which the message is to be sent. In another embodiment, CAS 108-109 may request that a short code and/or extension be assigned to the message before it is sent to the destination mobile device. As CAS 108-109 may employ different short code and/or extension allocation expectations, in one embodiment, each application might be registered with SCM 106 to specify how short codes and/or extensions are to be allocated.

In one embodiment, a network carrier might provide registration for an application managed by CAS 108-109. In one embodiment, one network carrier might indicate one short code for an application, while a different network carrier might indicate a different short code for the same application. Thus, in one embodiment network carriers might register with SCM 106 and provide a short code policy that includes an extension allocation specification, such as described in more detail below in conjunction with FIG. 2.

Message handlers 107 are described in more detail below in conjunction with FIG. 2. Briefly, however, message handlers 107 include virtually any computing device that may be configured to receive and to route a message. Message handlers 107 determine, in part, which network carrier a message is to be routed through to one of mobile devices 102-104. Message handlers 107 may make such determination based on a variety of criteria, including, but not limited to a destination mobile device identifier, a service agreement, a quality of service, a cost of delivery of a message, an application type, a message type, or the like. In one embodiment, message handlers 107 may request a short code and/or extension from SCM 106 based on the determined network carrier, and the network carrier's short code policy and extension allocation specification.

SCM 106 is described in more detail below in conjunction with FIG. 2. Briefly, however, SCM 106 is configured to manage short code, extensions, and session data for messages sent between CAS 108-109 and mobile devices 102-104. SCM 106 may receive requests for short codes and/or extensions from message handlers 107. In one embodiment, SCM 106 may also receive from message handlers 107 information about a network carrier through which a message received from an application is to be sent to send a mobile device. In one embodiment, SCM 106 may also receive the message, information about the sending application, or the like. Such information may be used by SCM 106 to assign a short code and/or extension to the message. In one embodiment, SCM 106 may modify the message to include the assigned short code and/or extension. In another embodiment, however, message handlers 107 may modify the message to include the assigned short code and/or extension. Message handlers 107 may then employ the determined network carrier to send the message to the destination mobile device.

In one embodiment, a message may be received from one of mobile devices 102-104 by message handlers 107. Message handlers 107 may request SCM 106 to determine which application managed by CAS 108-109 should the received message be directed towards. In one embodiment, SCM 106 might examine a portion of the message body, header, or the like to determine the application. In one embodiment, the received message might include a service code, or an assigned short code and extension that SCM 106 might employ to determine the application. Once the application is determined, message handlers 107 may then forward the message on to the determined application.

Although SCM 106 and message handlers 107 are illustrated as separate computing devices, the invention is not so limited. For example, the functions of SCM 106 and message handlers 107 may be implemented within a single computing device, or distributed across a plurality of computing devices. For example, the functions of message handlers 107 associated with managing MO messages might be implemented in one or more different computing devices, while the functions associated with managing MT messages may be implemented within still different computing devices.

Figure 2:
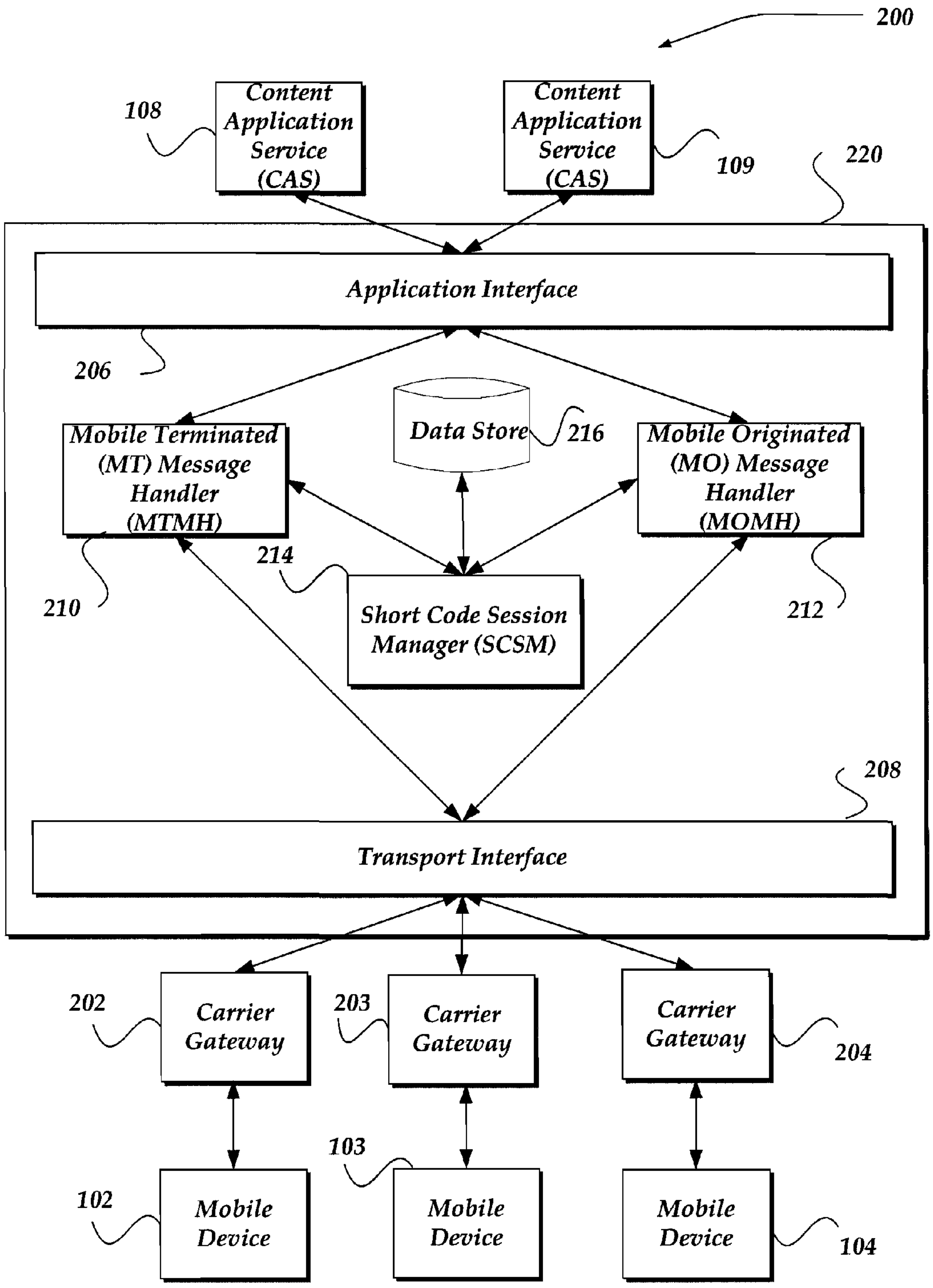
FIG. 2 shows a functional block diagram illustrating one embodiment of an expanded view and related interfaces for components within FIG. 1.

FIG. 2 shows a functional block diagram illustrating one embodiment of an expanded view and related interfaces for components within FIG. 1. System 200 may include many more or less components than those shown. The components shown, however, are sufficient to disclose an illustrative embodiment for practicing the invention.

As shown, system 200 includes routing service 220, CAS 108-109, carrier gateways 202-204, and mobile devices 102-104. Routing service 220 includes application interface 206, transport interface 208, data store 216, short code session manager (SCSM) 214, MT message handler (MTMH) 210, and MO message handler (MOMH) 212. In one embodiment, routing service 220 provides an expanded view of components of routing service 120 of FIG. 1. Thus, in one embodiment, MTMH 210, MOMH 212, application interface 220, and transport interface 208 may be implemented within message handlers 107 of FIG. 1. Similarly, in one embodiment, SCSM 212 and data store 216 may be implemented within SCM 106 of FIG. 1.

Carrier gateways 202-204 represent virtually any computing device that may be used by a network carrier to communicate network communications between mobile devices and another computing device. Such devices include but are not limited to network appliances, personal computers desktop computers, multiprocessor systems, microprocessor-based or programmable consumer electronics, network PCs, servers, or the like. In one embodiment, each carrier gateway might represent a different network carrier service; however, the invention is not so limited, and other arrangements are also envisaged.

Each network carrier may be assigned a range of short codes for use with an application, service, or the like. In one embodiment, at least two network carriers may employ different short code formats. For example, the network carrier associated with carrier gateway 202 might assign the range of 1110440900 to 1110440999 for short codes with extensions for SMS applications. The network carrier associated with carrier gateway 203, however, might assign the range of 445566891 to 445566910 to SMS applications. Moreover, these short codes with extensions might be shared by multiple SMS applications.

To manage the allocation and/or re-allocation of short codes with extensions, each network carrier may provide a short code policy. In one embodiment, the short code policy may be provided as an XML file, however, other formats may also be used. For example, in one embodiment, the short code policy may be a spreadsheet, HTML document, or the like. In one embodiment, the short code policy may be provided to SCSM 214 during registration of the network carrier, and/or when a change in the policy is desired, or the like. In one embodiment, the network carrier might indicate where the short code policy may be obtained, such as through a hyperlink, or the like. In any event, the short code policy may include, but is not limited to, a carrier identifier, a list of service short codes, a list of short codes including extensions, and an extension allocation specification.

FIG. 7 illustrates one embodiment, of an example of contents of a short code policy 700. It should be understood, however, that short code policy 700 is merely one example of possible embodiments, and as such, is not intended to limit the invention in any manner. Short code policy 700 may include zero or more service short codes 702. As illustrated, multiple service short codes may be specified by a network carrier. As shown, Carrier XYZ has two service short codes: "92466," and "445566," where service short code "445566" is mapped to application "social networking2."

Also illustrated in FIG. 7, multiple, non-contiguous ranges 704 of short code with extensions can be specified. In one embodiment, the short code and extension ranges may include a low value and a high value. As illustrated, ranges 704 shows three non-contiguous ranges of short codes with extensions.

FIG. 7 further shows extension allocation specification 706 that specifies how extensions are to be managed. As illustrated, for this example, there are 2073 extensions available from three non-contiguous short codes with extension ranges for carrier XYZ. Allocation policy 708 indicates how the network carrier would have the short codes with extensions allocated. In one embodiment, the allocation policy may be defined for a specified application and/or a specified range of extensions, for the given network carrier.

The allocation policy may be denoted using a variety of mechanisms. However, as illustrated in allocation policy 708, a numeric value may be associated with various defined policies. Thus, in this example, the numeric values may range from 0 through 3. In one embodiment, a 0 allocation policy might refer to a dynamical recycle allocation policy, where the extensions may be allocated dynamically. When the current extensions are consumed, the re-allocation may be based on recycling or re-using the oldest extension. That is, the re-allocation may be based on recycling extensions based on when an extension was assigned to a message. In one embodiment, reserved extension ranges may be excluded from the dynamical recycle allocation policy.

Another allocation policy includes the range recycle allocation policy. In this policy, allocation of extensions may occur from a range of extensions reserved fro an application. When the all of the extensions within the range are allocated, the oldest currently assigned session's extension may be reused, or assigned to another session/message. In one embodiment, the age of a session might be indicated by its last-modification time. However, other age indicators may also be used. If multiple extension ranges are reserved for an application, a range name might also be included in the short code policy 700 to indicate from which range an extension will be allocated from. In one embodiment, range recycle allocation might be designated by a 1 value.

Yet another allocation policy includes a pass-through allocation policy. In this policy, one or more ranges of short code and extensions may be reserved for an application. Thus, the application may allocate the short code and/or extension by itself from the reserved range(s). In one embodiment, session data may still be saved for this policy, along with the short code and extension. In one embodiment, pass-through allocation might be designated by a 2 value.

Still another allocation policy includes re-usekey based allocation, which might be designated by a 3 value. Re-usekey based allocation refers to allocation of a short code and extension from a range of reserved short codes and extensions for an application. When the range of short code and extensions are allocated, a selection of a short code and extension for re-allocation may be based on the oldest session. In one embodiment, short codes and extensions may be specific to an application. Thus, re-allocation of extensions may be performed from within an application specific short code and extension range and further from a group of sessions associated with that application.

It should be recognized however, that the invention is not limited to these example extension allocation policies and more or less extension policies may be used. Moreover, different extension policies than those described may also be implemented, without departing from the scope of the invention.

Referring back to FIG. 2, SCSM 106 may receive the short code policy, such as described above, and store it within data store 216. SCSM 106 may then employ the short code policy to determine how to allocate and/or re-allocate short codes and extensions for a message sent towards a mobile device.

MTMH 210 is configured to receive a message, such as a MT message from one of CAS 108-109. In one embodiment, the message may be received through application interface 206. Application interface 206 may represent any of a variety of communication interfaces, including, but not limited to HTTP interfaces, or the like. When MTMH 210 receives the MT message, a determination may be made to identify a carrier gateway (network carrier) through which the message is to be sent towards a destination mobile device. MTMH 210 may make such determination based on a variety of criteria, including, but not limited to those identified above. MTMH 210 may then provide information about the determined network carrier to SCSM 214, with a request for allocation of a short code and/or extension. SCSM 214 may then employ the short code policy for the determined network carrier to allocate/re-allocate short codes and extensions. In one embodiment, an application might provide a short code and/or extension that might then mapped to a short code and extension within the policy specified by the network carrier. Thus, in one embodiment, applications may be configured to be independent of network specific short codes and extensions. SCSM 214 then manages the mapping to a specific network carrier, relieving the applications from additional workloads.

In one embodiment, SCSM 214 may also collect and store various session data associated with the message. Such session data may include the message, the message headers, a destination identifier, an application identifier, a user identifier including, for example, a user name, user account, a user alias, or the like. The session data, however, is not limited to this information, and other information may also be collected and stored, including time related information that may be employed to determine an age of a communication session. In one embodiment, SCSM 214 may modify the message to include the short code and/or extension. In another embodiment, MTMH 210 may modify the message with the short code and/or extension. MTMH 210 may then employ transport interface 208 to enable sending of the modified message to the destination mobile device using the carrier gateway associated with the determined network carrier.

Messages received from a mobile device, such as mobile devices 102-104, are received through transport interface 208 from one of carrier gateways 202-204, and are received by MOMH 212. MOMH 212 may, in one embodiment, provide the message, or portions of the message, to SCSM 214 to determine to which application the message should be forwarded. SCSM 214 may examine the message, message header, or the like, to determine whether a service code, short code and extension, or the like, is specified. If an assigned short code and extension is identified. SCSM 214 may search data store 216 for associated session data. SCSM 214 may employ the session data to determine to which application the message is to be forwarded. SCSM 214 may provide such information, including the session data, to MOMH 212 such that the message, with the session data, may be forwarded to the determined application. In one embodiment, additional information within the content of the message might also be used to determine the application to receive the message. In one embodiment, routing service 220 may employ a process such as described below in conjunction with FIGS. 4-6 to perform at least some of its actions.

Illustrative Server Environment

Figure 3:
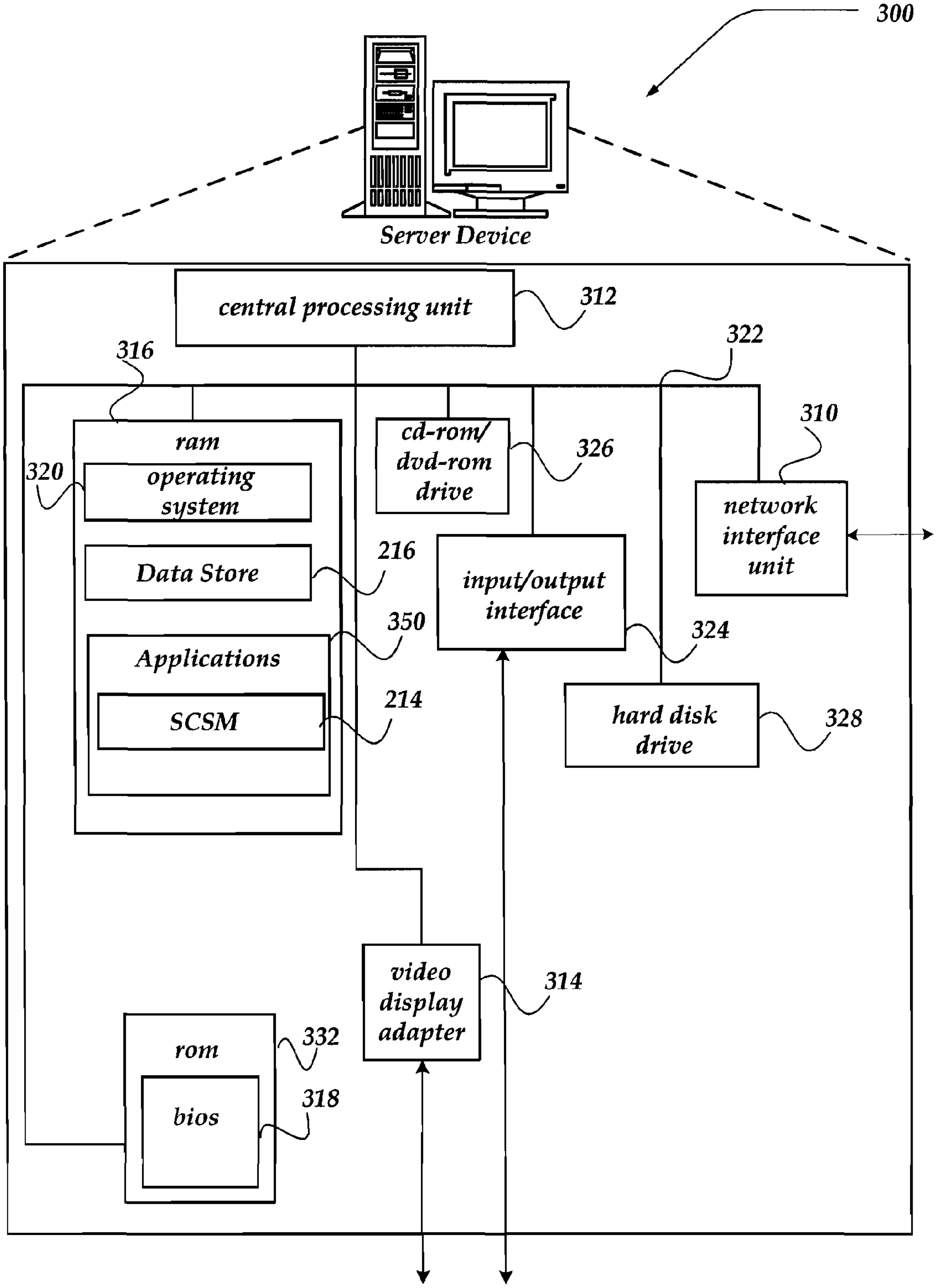
FIG. 3 shows one embodiment of a server device that may be included in a system implementing the invention.

FIG. 3 shows one embodiment of a server device, according to one embodiment of the invention. Server device 300 may include many more components than those shown. The components shown, however, are sufficient to disclose an illustrative embodiment for practicing the invention. Server device 300 may, for example, SCM 106 of FIG. 1.

Server device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of server device 300. Any general-purpose operating system may be employed. Basic input/output system ("BIOS") 218 is also provided for controlling the low-level operation of server device 300. As illustrated in FIG. 3, server device 300 also can communicate with the Internet, or some other communications network, such as network 105 in FIG. 1, via network interface unit 310, which is constructed for use with various communication protocols including the TCP/IP protocol. Network interface unit 310 is sometimes known as a transceiver, transceiving device, network interface card (NIC), and the like.

Server device 300 may also include an SMTP handler application for transmitting and receiving email. Server device 300 may also include an HTTP handler application for receiving and handing HTTP requests, and an HTTPS handler application for handling secure connections. The HTTPS handler application may initiate communication with an external application in a secure fashion.

Server device 300 also includes input/output interface 324 for communicating with external devices, such as a mouse, keyboard, scanner, or other input devices not shown in FIG. 3. Likewise, server device 300 may further include additional mass storage facilities such as CD-ROM/DVD-ROM drive 326 and hard disk drive 328. Hard disk drive 328 is utilized by server device 300 to store, among other things, application programs, databases, and the like.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs include email programs, schedulers, calendars, transcoders, messaging services, database programs, word processing programs, spreadsheet programs, and so forth. Mass storage may further include applications such as data store 216 and SCSM 214. SCSM 214 is described above in conjunction with FIG. 2.

Data store 216 may include virtually any mechanism configured and arranged to store and otherwise manage short codes, extensions, and session data. Data store 216 may also be configured, in one embodiment, to manage or otherwise provide information useable to access a short code policy for a network carrier. In one embodiment, session data may be stored using a short code and extension. However, the invention is not so limited, and other indexing mechanisms may also be used. Data store 216 may be implemented using, for example, a database, a script, a spreadsheet, a file structure, folders, a program, or the like.

Generalized Operation

Figure 4:
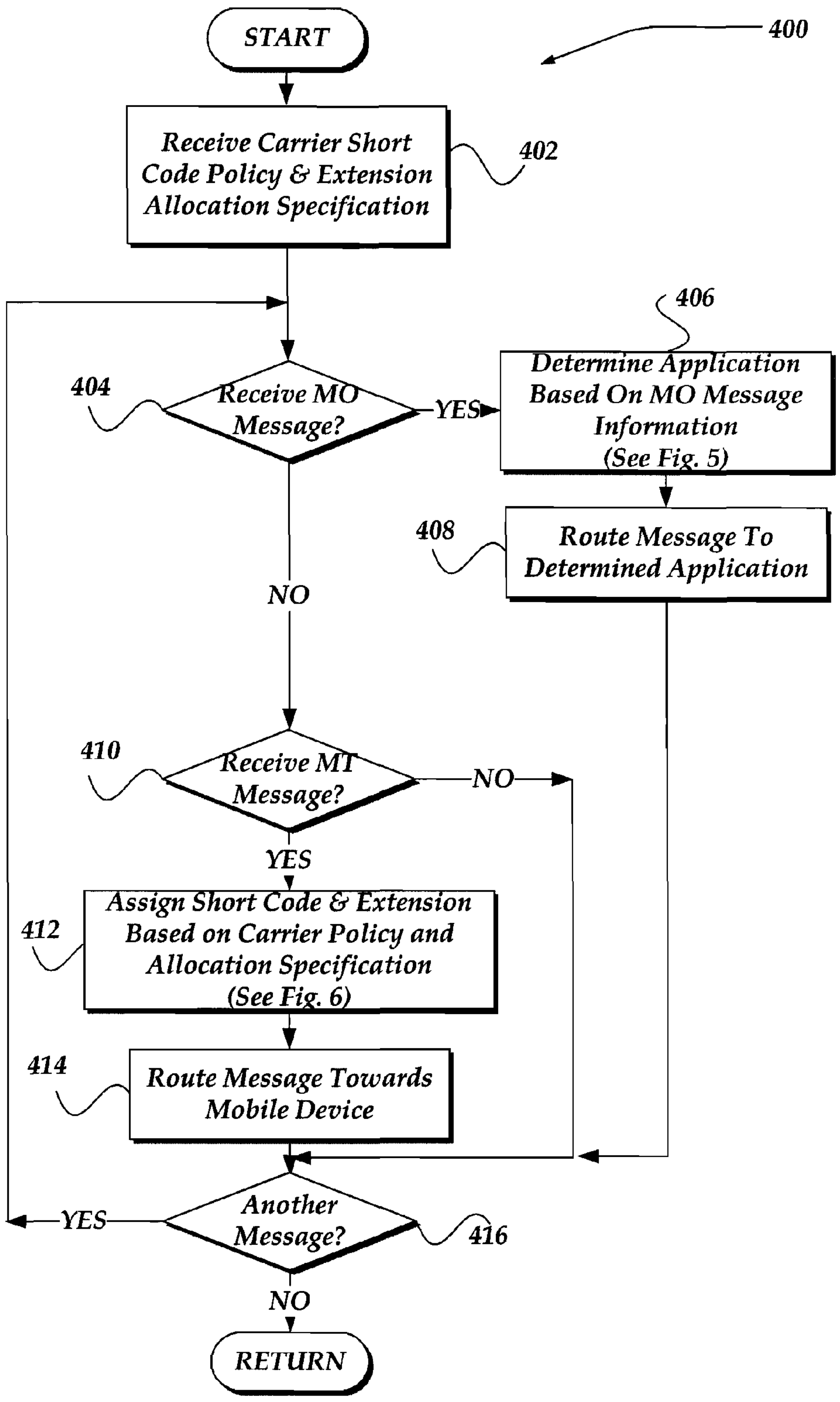
FIG. 4 illustrates a logical flow diagram generally showing one embodiment of an overview process for employing dynamic allocations of short codes with disparate network carriers and applications.

The operation of certain aspects of the invention will now be described with respect to FIGS. 4-6. FIG. 4 illustrates a logical flow diagram generally showing one embodiment of an overview process for employing dynamic allocations of short codes and extensions with disparate network carriers and applications. Process 400 of FIG. 4 may be implemented, in one embodiment, within routing service 120 of FIG. 1.

Process 400 of FIG. 4 begins, after a start block, at block 402, where a network carrier's short code policy is received. As noted elsewhere, the short code policy may include, but is not limited to a network carrier's identifier, a list of service short codes, a list of short codes including extensions, and an extension allocation specification. In one embodiment, the extension allocation specification indicates, among other things, which extension allocation policy is to be used for a given range of extensions for the network carrier. At block 402, a plurality of short code policies, including extension allocation specifications may be received, each for a respective network carrier within a plurality of network carriers.

Processing then moves to decision block 404 where a determination is made whether a mobile originated (MO) message is received from a network carrier. In one embodiment, the MO message may be an SMS message. However, the invention is not so limited, and other communication protocols may also be used. In any event, if an MO message is received, processing flows to block 406; otherwise, processing continues to decision block 410.

One embodiment of block 406 is described in more detail below in conjunction with FIG. 5. Briefly, however, at block 406, an application to which the MO message is to be routed is determined based on MO message information. Such message information may include, but is not limited to a provided short code, extension, message content, and/or stored session data. Processing then continues to block 408, where the MO message may then be routed to the determined application. Processing then flows to decision block 416.

At decision block 410, a determination is made whether a mobile terminated (MT) message is received. However, the invention is not so limited, and other communication protocols may also be used. In any event, if an MT message is received, then processing continues to block 412; otherwise, processing branches to decision block 416.

One embodiment of block 412 is described in more detail below in conjunction with FIG. 6. Briefly, however, at block 412, a short code and extension is assigned to the MT message based on a network carrier determined to deliver the message to a mobile device. At block 412, the message may be modified to include the assigned short code and extension. Process 400 then moves to block 414 where the modified message is then routed to the mobile device using the determined network carrier. Processing next flows to decision block 416.

At decision block 416, a determination is made whether another message is received. If not, processing may return to a calling process to perform other actions; otherwise, processing may loop back to decision block 404.

Figure 5:
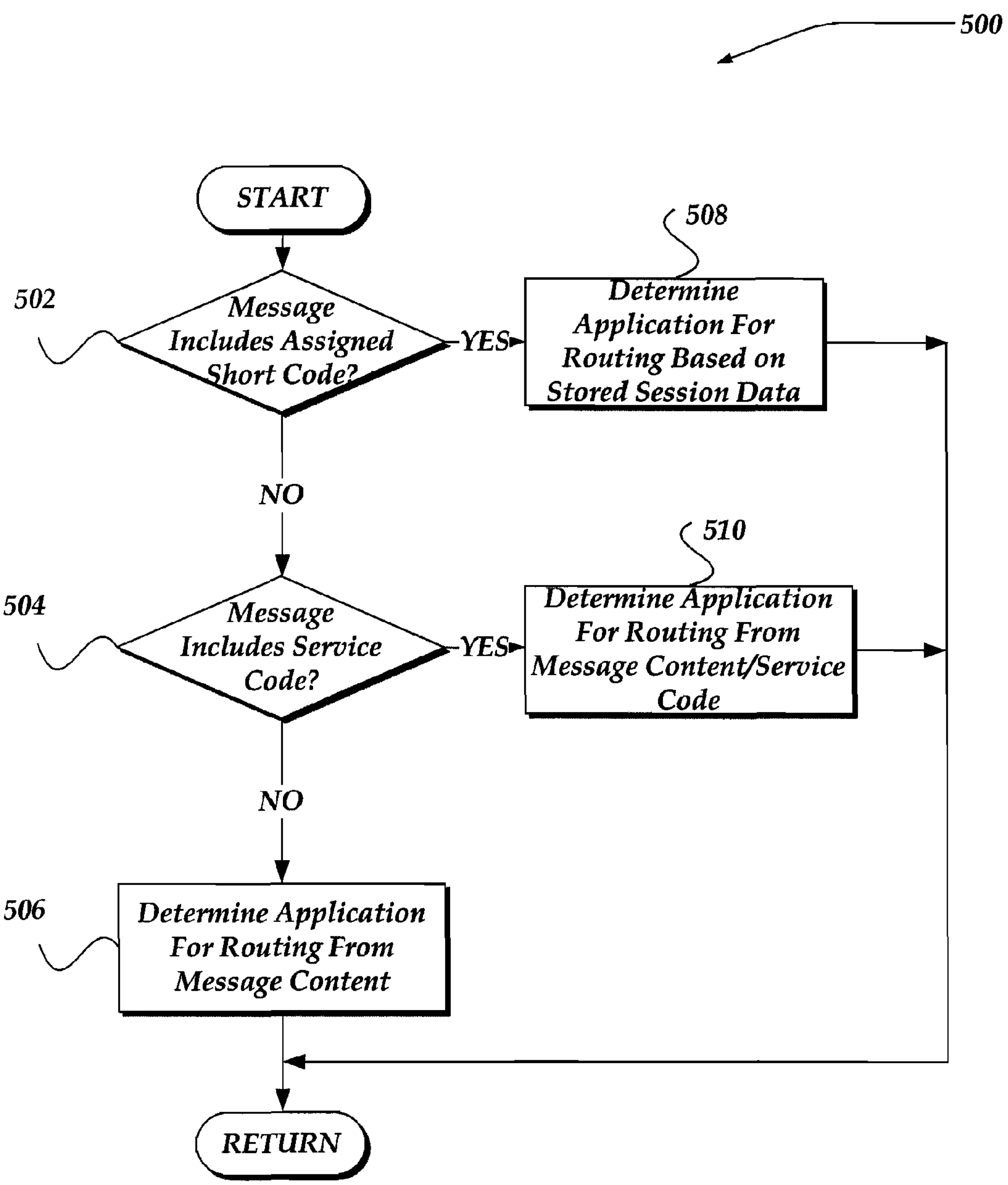
FIG. 5 illustrates a logical flow diagram generally showing one embodiment of an overview process for managing mobile originated messages.

FIG. 5 illustrates a logical flow diagram generally showing one embodiment of an overview process for managing mobile originated (MO) messages. Process 500 of FIG. 5 may, in one embodiment, represent block 406 of FIG. 4. However, the invention is not so limited, and other implementations may also be used.

In one embodiment, process 500 begins, after a start block, at decision block 502, where a determination is made whether the received message includes an assigned short code. This may arise, for example, where a user has received a prior message, or other information, that provided the user of the mobile device with the assigned short code. In one embodiment, the short code may also include an extension. If the message does include an assigned short code (and perhaps an extension), processing flows to block 508; otherwise, processing continues to decision block 504.

At block 508, the assigned short code may be used as an index to locate stored session data. The session data may be have stored based on a prior communication from an application to the mobile device (e.g., an MT message). The retrieved session data may then be used to determine an application to which the received message is to be sent. Processing then returns to the calling process to perform further actions. In one embodiment, the calling process is process 400, where the received message is routed to the determined application.

At decision block 504, a determination is made whether the received message includes a service code. Such service codes, as noted above may be employed with multiple applications, and might not include an extension. If a service code is included in the message, processing flows to block 510; otherwise, processing flows to block 506.

At block 510, contents of the message may be examined to determined, in conjunction with the service code, which application to which the message is to be sent. The process then returns to the calling process to perform further actions, including, in one embodiment, of routing the message to the determined application.

At block 506, the content of the message may be examined to determine the application to which the message is to be routed. Information within the message that may be useful includes, but is not limited to, text specifying an application, commands directed towards a specific application, or the like. The process then returns to the calling process to perform further actions, including, in one embodiment, of routing the message to the determined application.

Figure 6:
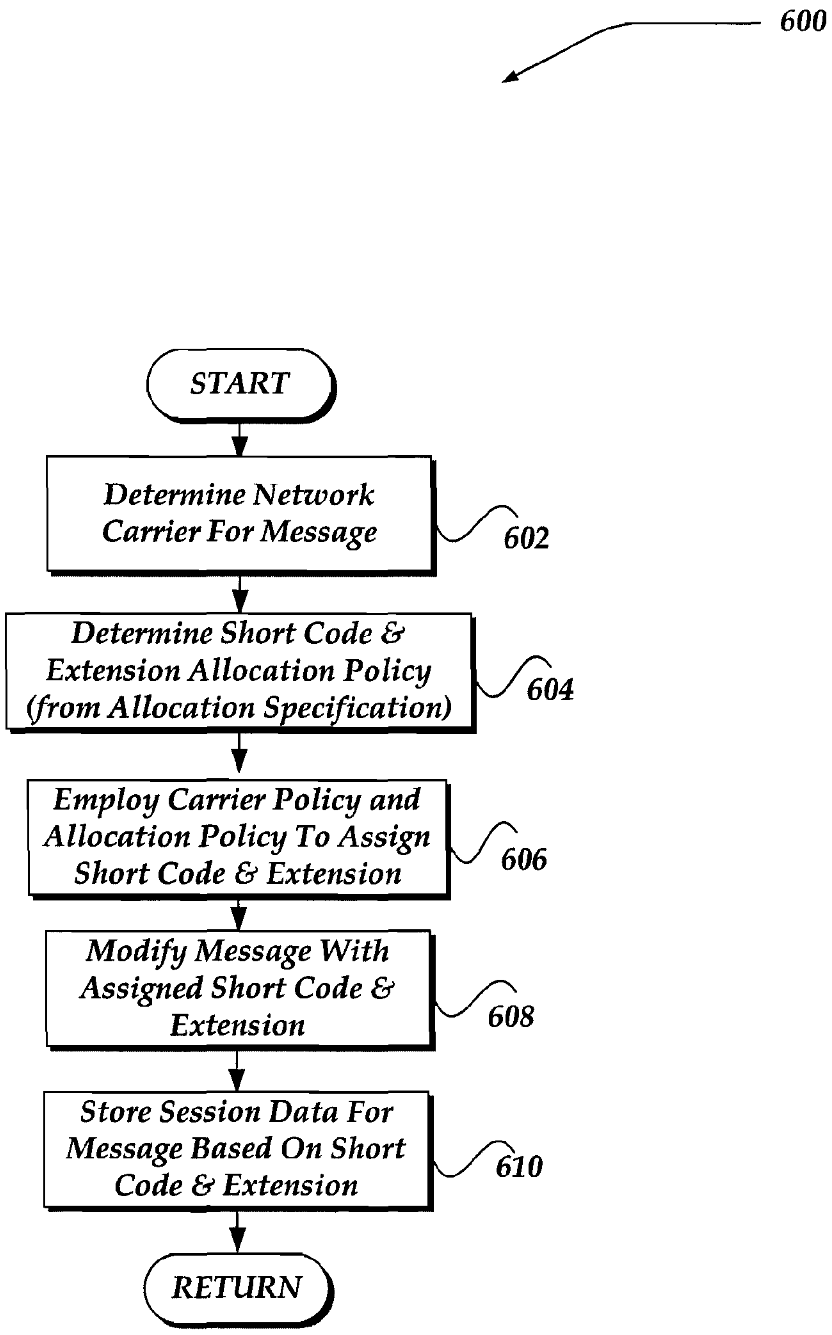
FIG. 6 illustrates a logical flow diagram generally showing one embodiment of an overview process for dynamically assigning short codes and extensions for mobile terminated messages.

FIG. 6 illustrates a logical flow diagram generally showing one embodiment of an overview process for dynamically assigning short codes and extensions for mobile terminated (MT) messages. Such messages may be sent to routing service 120 of FIG. 1 from any of a variety of registered applications from content application services 108-109 of FIG. 1.

Process 600 of FIG. 6 may represent one embodiment of block 412 of FIG. 4. However, the invention is not so limited, and other implementations may also be used, without departing from the scope of the invention.

Process 600 begins, after a start block, at block 602, where a network carrier is determined through which the message is to be routed to the destination mobile device. The network carrier may be determined based on a mobile device identifier of the destination mobile device. For example, many of today's mobile devices are associated with a specific network carrier. Thus, in one embodiment, the network carrier may be selected based on the destination mobile device. However, in another embodiment, a network carrier may also be selected based on other criteria, including but not limited to, service type associated with the application and/or the destination mobile device, cost of delivery, a desired service level or quality of service, delivery times desired, any preferred routing, type of message, or the like.

Process 600 moves next to block 604, where an associated short code policy, including extension allocation policy (from the allocation specification), for the determined network carrier is obtained and examined. Processing then flows to block 606, where the network carrier policy, including the extension allocation policy is used to assign a short code and/or extension. In one embodiment, the application may provide a short code and/or extension, such as during pass-through allocations. Thus, in one embodiment, at block 606, the short code and/or extension from the application may be employed. However, in another embodiment, the extension allocation policy may be one of a dynamical recycle allocation, range recycle allocation, or a re-usekey based allocation policy, as described above. Thus, the short code and/or extensions may be determined based on the short code policy and extension allocation policy for the determined network carrier, and sending application. Where extensions are currently available, in one embodiment, the next unused extension may be assigned for the message with the short code. Where there are currently no more extensions available for the given application, network carrier, re-allocations may be determined based on the extension allocation policy. Moreover, assigning the short code and/or extensions may include mapping a short code and/or extension provided by the application to a different short code and/or extension based on the short code policy and extension allocation policy.

Process 600 then moves to block 608, where the assigned short code and/or extension are used to modify the message. In one embodiment, the message may be modified to include a reference to the short code and extension. In another embodiment, a header, such as a source header for the message, may be modified to include the short code and extension. Processing then flows to block 610, where various data related to the current session for the message may be stored. As noted, such session data may include, but is not limited to, an identifier of the application, the message, a network carrier identifier, a user account identifier, a user name, a user alias, or the like, a destination identifier, such as a mobile device identifier, or the like. In one embodiment, the session data may also include time information, including, when the message is sent, or the like. In one embodiment, the short code and/or extension may be used as an index for storing and retrieving the session data. Process 600 may then return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A server device for use in managing a communication to a mobile device over a network, comprising:
- a memory for use in storing data and machine instructions;
- a processor in communication with the memory and is configured to receive data and machine instructions that enable the processor to perform actions, including:
  - receiving from each of a plurality of network carriers a short code policy, including an extension allocation policy;
  - receiving a message from an application within a plurality of applications to be communicated to a mobile device from among a plurality of mobile devices;
  - determining based on a cost of delivering the message and a mobile device identifier of the mobile device a network carrier from among the plurality of network carriers through which the message is to be routed to the mobile device, wherein the cost of the network carrier is determined separate from content of the received message;
  - employing the short code policy, including the extension allocation policy associated with the determined network carrier to assign a short code and extension to the received message;
  - modifying the message to include the assigned short code and extension; and
  - enabling the modified message to the transmitted to the mobile device using the determined network carrier.

2. The server device of claim 1, wherein the extension allocation policy specifies at least one of the following:
- a dynamic recycle allocation, wherein the short code extension is allocated dynamically from a collection of short code extensions and if all the available short code extensions are assigned from the collection, recycling a short code extension based on when the short code extension was assigned; or
- a range recycle allocation, wherein the short code extension is allocated from a range of short code extensions reserved based on the application, and if each short code extension in the range of short code extensions are currently assigned, selecting a session to reuse the short code extension based on an age of the session.

3. The server device of claim 1, wherein the assigned short code extension is selected from a collection of short code extensions having at least two non-contiguous ranges of short code extensions.

4. The server device of claim 1, wherein data and machine instructions that enable the processor to perform actions, including:
- receiving from the mobile device another message;
- if the other message includes the assigned short code, employing session data to determine which application within the plurality of applications to route the other message;
- if the other message includes a service short code, examining a content of the other message and using the examined content and the service short code to determine which application to route the other message; and
- if the other message is absent of the assigned short code or the service short code, examining the content of the other message to determine which application to route the other message.

5. The server device of claim 1, wherein dynamically assigned the short code extension further comprises mapping a first short code extension received from the application to another short code extension selected from a collection of short code extensions assigned to the determined network carrier.

6. A system for use in managing a communication to a mobile device over a network, comprising:

a plurality of network carriers, wherein each network carrier is allocated at least one short code and a plurality of assignable short code extensions, at least one of the plurality assignable short code extensions for one of the network carriers including at least two non-contiguous sequences of short code extensions; and a routing service that is configured to perform actions, including: receiving from each of the network carriers within the plurality of network carriers a short code policy including an extension allocation policy for the respective network carrier's assignable short codes;

receiving a message from an application to be communicated to a mobile device from among a plurality of mobile devices;

determining based on a cost of delivering the message and a mobile device identifier of the mobile device a network carrier from the plurality of network carriers through which the message is to be routed to the mobile device, wherein the cost of the network carrier is determined separate from content of the received message;

employing the short code policy, including the extension allocation policy associated with the determined network carrier to select a short code and assignable short code extension to the received message;

modifying the message to include the selected short code extension and short code; and enabling the modified message to the transmitted to the mobile device using the determined network carrier.

7. The system of claim 6, wherein the routing service being configured to perform actions, further including:

employing the selected short code and extension to store session data for the message, wherein the session data comprises at least one of at least a portion of the message, an identifier associated with the mobile device, or an identifier of the application.

8. The system of claim 6, wherein the extension allocation policy specifies at least one of the following;

a dynamical recycle allocation, wherein the short code extension is allocated dynamically from a collection of short code extensions and if all the assignable short code extensions for the determined network carrier are each currently assigned, recycling a short code extension based on when the short code extension was assigned; or a range recycle allocation, wherein the short code extension is allocated from a range of short code extensions reserved based on the application, and if each short code extension in the range of short code extensions are currently assigned, selecting a session to reuse the session's assigned short code extension based on an age of the session.

9. The system of claim 6, wherein the application provides a first short code to the routing service, and based on the determined network carrier and short code policy, mapping the first short code to one of the assignable short code extensions and short code associated with the application to dynamically select one of the assignable short code extensions for the received message.

10. The system of claim 6, wherein the routing service being configured to perform actions, further including:

using the selected short code and extension as an index for storing and managing session data, the session data having at least one of at least a portion of the message, a mobile device identifier, or a user identifier; and if a mobile originated message is received, using in part, the session data to determine another application to which the mobile originated message is to be routed.

11. A method for use in managing a communication to a mobile device over a network, comprising:

receiving from each of a plurality of network carriers a short code policy, including an extension allocation policy, wherein at least one of the network carriers have assignable short code extensions with at least two sequences within the assignable short code extensions for the respective network carrier being non-contiguous;

receiving, from an application, a mobile terminated (MT) message to be communicated to a mobile device from among a plurality of mobile devices;

determining based on a cost of delivering the message and a mobile device identifier of the mobile device a network carrier from among the plurality of network carriers through which the MT message is to be routed to the mobile device, wherein the cost of the network carrier is determined separate from content of the received message;

employing the short code policy, including the extension allocation policy, associated with the determined network carrier to assign a short code and extension to the MT message;

modifying the MT message to include the assigned short code with the extension; and enabling the modified MT message to the transmitted to the mobile device using the determined network carrier.

12. The method of claim 11, wherein assigning the short code and extension further comprises mapping a first extension received from the application to another extension selected from the assignable short code extensions designated by the determined network carrier's short code policy and extension allocation policy.

13. The method of claim 11, wherein each network carrier's short code policy further comprises at least one of a carrier identifier, a list of service short codes for the network carrier each service short code being mapped to at least one application, and a list of assignable short code extensions.

14. The method of claim 11, wherein at least one extension allocation policy further specify virtual short code extensions supportable by at least two short code extension ranges for the respective network carrier.

15. The method of claim 11, wherein the extension allocation policy specifies at least one of the following:

a dynamical recycle allocation, wherein the short code extension is allocated dynamically from a collection of short code extensions and if all the assignable short code extensions for the determined network carrier are each currently assigned, recycling a short code extension based on when the short code extension was assigned; or a range recycle allocation, wherein the short code extension is allocated from a range of short code extensions reserved based on the application, and if each short code extension in the range of short code extensions are currently assigned, selecting a session to reuse the session's assigned short code extension based on an age of the session.

16. The method of claim 11, wherein the short code is selected based on at least one of a service or the application.

17. An apparatus for use in managing a communication to a mobile device over a network, comprising:

message handlers configured to receive and to send messages over the wireless network to or from a plurality of network carriers; and a processor, coupled to the transceiver, that is arranged to perform actions, including:

receiving from each of the plurality of network carriers a short code policy, including an extension allocation policy;

receiving a mobile terminated (MT) message from an application within a plurality of applications to be communicated to a mobile device from among a plurality of mobile devices;

determining based on a cost of delivering the message and a mobile device identifier of the mobile device a network carrier from among the plurality of network carriers through which the MT message is to be routed to the mobile device, wherein the cost of the network carrier is determined separate from content of the received MT message;

employing the short code policy, including the extension allocation policy associated with the determined network carrier to assign a short code and extension to the received message;

modifying the MT message to include the assigned short code and extension; and enabling the modified message to the transmitted to the mobile device using the determined network carrier.

18. The apparatus of claim 17, wherein the short code is assigned based, in part, on the application and network carrier's short code policy, and the extension is selected based on the extension allocation policy that specifies at least one of the following allocation schemes: a dynamical recycle allocation scheme, a range recycle allocation scheme, or a re-usekey based allocation scheme, wherein the re-use key based allocation scheme allocates an extension from a range of assignable short code extensions reserved for the application and if each of the assignable short code extensions within the range are currently assigned then selecting a extension based on a session age.

19. The apparatus of claim 17, employing the selected short code and extension to store session data for the message, wherein the session data comprises at least one of at least a portion of the message, an identifier associated with the mobile device, or an identifier of the application.

20. The apparatus of claim 17, wherein the short code policy identifies at least two sequences of non-contiguous extensions for the network carrier.

* * * * *